(12) United States Patent
Balgard et al.

(10) Patent No.: US 8,749,353 B2
(45) Date of Patent: Jun. 10, 2014

(54) WIRELESS COMMUNICATION BETWEEN TWO TEMPORARILY CONNECTED DEVICES

(75) Inventors: Lennart Balgard, Arboga (SE); Niclas Ericsson, Vasteras (SE); Ewa Hansen, Vasteras (SE); Mikael Gidlund, Sundsvall (SE)

(73) Assignee: ABB Research Ltd. (CH)

( * ) Notice: Subject to any disclaimer, the term of this patent is extended or adjusted under 35 U.S.C. 154(b) by 0 days.

(21) Appl. No.: 13/599,883

(22) Filed: Aug. 30, 2012

(65) Prior Publication Data

US 2013/0057389 A1     Mar. 7, 2013

Related U.S. Application Data

(63) Continuation of application No. PCT/EP2010/052521, filed on Mar. 1, 2010.

(51) Int. Cl.
    *H04Q 5/22*      (2006.01)
    *G08B 13/14*      (2006.01)
    *H01R 3/00*      (2006.01)
    *H02J 7/00*      (2006.01)

(52) U.S. Cl.
    USPC ....... 340/10.1; 340/572.1; 439/488; 439/955; 320/109

(58) Field of Classification Search
None
See application file for complete search history.

(56) References Cited

U.S. PATENT DOCUMENTS

| | | | |
|---|---|---|---|
| 8,233,804 B2 * | 7/2012 | Aguren | 398/115 |
| 2005/0084022 A1 | 4/2005 | Okuyama | |
| 2006/0136646 A1 | 6/2006 | Do et al. | |
| 2007/0221730 A1 | 9/2007 | McReynolds et al. | |
| 2009/0111378 A1 | 4/2009 | Sheynman et al. | |
| 2010/0241560 A1 * | 9/2010 | Landau-Holdsworth et al. | 705/39 |

FOREIGN PATENT DOCUMENTS

| | | | |
|---|---|---|---|
| CN | 1687912 A | | 10/2005 |
| CN | 2867462 Y | | 2/2007 |
| CN | 201210314 Y | | 3/2009 |
| JP | 2004-260300 | * | 9/2004 |

(Continued)

OTHER PUBLICATIONS

International Search Report & Written Opinion of the International Searching Authority; Application No. PCT/EP2010/052521; Issued: Nov. 22, 2010; Mailing Date: Nov. 26, 2010; 11 pages.

(Continued)

*Primary Examiner* — Brian Zimmerman
*Assistant Examiner* — Thomas McCormack
(74) *Attorney, Agent, or Firm* — St. Onge Steward Johnston & Reens LLC

(57) ABSTRACT

A system for setting up a wireless connection between two temporarily connected devices includes a device interconnector having a first end provided with a first wireless communication identifier and a second end provided with a second wireless communication identifier, a first device having a first interconnector mating unit, a first wireless communication unit and a first reading unit and a second device having a second interconnector mating unit, a second wireless communication unit and a second reading unit. The wireless communication units of each device is configured to receive an identifier being read by the corresponding reading unit as the device interconnector is attached to the corresponding mating unit and the wireless communication unit is configured to employ this identifier in setting up, together with the other wireless communication unit, a wireless connection between the two devices.

13 Claims, 4 Drawing Sheets

(56) References Cited

FOREIGN PATENT DOCUMENTS

| | | | |
|---|---|---|---|
| JP | 2004260300 A | | 9/2004 |
| JP | 2005-094096 | * | 4/2005 |
| JP | 2005094096 A | | 4/2005 |
| JP | 2006074868 A | | 3/2006 |
| JP | 2006252466 A | | 9/2006 |
| JP | 2006280119 A | | 10/2006 |
| WO | 02100047 A1 | | 12/2002 |
| WO | 2009093705 A1 | | 7/2009 |

OTHER PUBLICATIONS

"Low-cost charging systems with full communication capability", EVS24, Stavanger, Norway, May 13-16, 2009.

Notice of Reasons for Rejection from Japanese Patent Office Application No. JP 2012-555304 Issued: Mar. 19, 2013 5 pages (orignal and English translation).

Official Action from the Patent Office of the Russian Federation Application No. 2012141565 Issued: Nov. 14, 2013 4 pages.

* cited by examiner

WIRELESS COMMUNICATION BETWEEN TWO TEMPORARILY CONNECTED DEVICES

CROSS-REFERENCE TO RELATED APPLICATIONS

The present application is a continuation of pending International patent application PCT/EP2010/052521 filed on Mar. 1, 2010 which designates the United States, the content of which is incorporated herein by reference.

FIELD OF THE INVENTION

The present invention generally relates to providing wireless communication between two temporarily connected devices. More particularly the present invention relates to a method of setting up a wireless connection between two temporarily connected devices, a device interconnector for allowing a wireless connection to be set up between two temporarily connected devices as well as an arrangement and system for setting up a wireless connection between two temporarily connected devices.

BACKGROUND OF THE INVENTION

Temporary physical connections of two devices to each other are common in a number of fields of technology. One area is the charging of batteries in vessels, such as vehicles like automobiles. Other areas where this may be of interest can be for providing electric power to a piece of electrically operated equipment. Another example is the filling of a tank with a liquid, such as gas or burning oil. In these and other cases there may exist an interest in conveying additional data in both directions between the devices. This may for instance be of interest when a quantity of a physical entity is transported from one of the devices to the other, where the entity can be electrical energy or a liquid such as oil and gas. There are many reasons why such data may need to be transmitted. One reason may be for economy, in order to perform an economical transaction associated with the transport. Another reason may be in order to control the quantity being transferred.

Such data can be transferred using extra wired communication and in the case of electrical charging also power line communication. Extra wires are complicated, expensive and lead to the use of additional connectors or to mixing of communication wires with power lines in one cable. Power line communication involves additional hardware for modulating the data on the electrical voltage. Both these measures involve additional work and also increased risks. Power line communication is furthermore only possible to use if electricity is involved.

The best choice is in many situations therefore to provide such additional data using a wireless connection.

Cyriacus Bleijs describes the use of power line communication in relation to charging of vehicles in "Low-cost charging systems with full communication capability", EVS24, Stavanger, Norway, May 13-16, 2009. The document also describes wireless communication, however not between temporarily connected devices such as vehicle and a charging post.

When providing a wireless connection, it is important that it is set up between the two devices in question and no other devices.

There is therefore a need for providing a unique identification in relation to the two devices being connected to each other for enabling a wireless connection to be set up between them.

There exist techniques for identifying devices.

For instance, in relation to wireless connections and electrical charging of a vehicle, there exist technologies for identifying the vehicle.

As is described in CN 201210314 a vehicle may be provided with a Radio Frequency IDentification (RFID) tag and a cable of a charging post may be equipped with an RFID reader. As a charging cable is connected to a charging socket on the vehicle, the RFID reader detects the RFID tag of the vehicle and reads vehicle ID relevant information, like license plate information.

RFID technology can also be combined with power line communication. This is described in JP 2006245983. Here a wall socket incorporates a PLC modem for power line communication. The socket also has a reader for reading an RFID tag of an RFID plug.

US 2007/0221730 describes computer cables provided with RFID tags. A cable socket is provided with an RFID reader in order to identify the cables for ensuring that the correct cable is inserted in the right socket.

However, none of these documents are related to providing identifiers to be used for wireless communication.

In view of what has been described above, there is therefore still a need for allowing two temporarily connected devices to be able to communicate wirelessly with each other even though they are unknown to each other.

SUMMARY OF THE INVENTION

One object of the present invention is to provide a method of setting up a wireless connection between two temporarily connected devices despite them being unknown to each other.

This object is according to a first aspect of the present invention solved through a method of setting up a wireless connection between two temporarily connected devices, comprising, in one of the devices, the steps of:

detecting the physical attachment of one end of a device interconnector to an interconnector mating unit of the device, where this end of the device interconnector is provided with a set of identifying data comprising a wireless communication identifier and the interconnector has another end provided with a further set of identifying data comprising a further wireless communication identifier, where the other end is provided for attachment to the other device, reading the wireless communication identifier of the end of the device interconnector the attachment of which has been detected, using the read wireless communication identifier in setting up, in conjunction with the other device, a dedicated two-way wireless connection with the other device, where the other device uses the other wireless communication identifier in the setting up of the connection, and exchanging data with the other device over the wireless connection.

Another object of the present invention is to provide an arrangement for setting up a wireless connection between two temporarily connected devices, despite these devices being unknown to each other.

This object is according to a second aspect of the invention achieved through an arrangement for setting up a wireless connection between two temporarily connected devices, which comprises:

one of the devices including
an interconnector mating unit for receiving one of a first or a second end of a device interconnector, where the received end is provided with a set of identifying data comprising a wireless communication identifier and the other end is provided with a further set of identifying data comprising a further wireless communication identifier related to the wireless communication identifier of the received end,
a reading unit configured to detect the wireless communication identifier of the received end as the device interconnector is attached to the interconnector mating unit, and
a wireless communication unit configured to receive the wireless communication identifier being read by the reading unit and set up, in conjunction with another device, a dedicated two-way wireless connection with this other device using the read wireless communication identifier, where the other wireless communication identifier is used by the other device in the setting up of said connection between the two devices.

Another object of the present invention is to provide a device interconnector for allowing a wireless connection to be set up between two temporarily connected devices despite these devices being unknown to each other.

This object is according to a third aspect of the invention achieved through a device interconnector for allowing a wireless connection to be set up between two temporarily connected devices, where the device interconnector has a first end adapted to be attached to a first device and a second end adapted to be attached to a second device, where the first end is provided with a first set of identifying data comprising a first wireless communication identifier and the second end is provided with a second set of identifying data comprising a second wireless communication identifier in order to allow the first and second devices to detect the first and second wireless communication identifiers upon the physical attachment of the device interconnector to these devices for use in the setting up of one two-way wireless connection between them based on the wireless communication identifiers.

Yet another object of the present invention is to provide a system for setting up a wireless connection between two temporarily connected devices despite these devices being unknown to each other.

This object is according to a fourth aspect of the invention achieved by a system for setting up a wireless connection between two temporarily connected devices, where the system comprises
 a device interconnector having a first end and a second end, where the first end is provided with a first set of identifying data comprising a first wireless communication identifier and the second end is provided with a second set of identifying data comprising a second wireless communication identifier related to the first wireless communication identifier,
 a first device having a first interconnector mating unit, a first wireless communication unit and a first reading unit,
 a second device having a second interconnector mating unit, a second wireless communication unit and a second reading unit,
wherein the wireless communication units of the devices are both configured to receive a wireless communication identifier being read by the corresponding reading unit as the device interconnector is attached to the corresponding mating unit and the wireless communication unit in question is configured to employ this wireless communication identifier in setting up, in conjunction with the other wireless communication unit, a dedicated two-way wireless connection between the two devices.

The present invention has a number of advantages. It solves the problem of how to make sure that the correct two devices are wirelessly connected when they are unknown to each other. This is also possible even if there are many similar devices within a range covered by radio communication units of these devices. The invention is also easy to use for a user. The wireless connection is automatically set up as the device interconnector is attached to two devices. This is especially important in applications for daily use like charging of electric vehicles. The invention can be provided at low cost because high volume, low cost standard components can be employed. The invention is also versatile, and can be used in many various applications.

BRIEF DESCRIPTION OF THE DRAWINGS

The present invention will in the following be described with reference being made to the accompanying drawings, where
 FIG. 1 schematically shows two devices, a vehicle and a charging post being interconnected via a device interconnector in the form of an electric cable.

DETAILED DESCRIPTION OF THE INVENTION

In the following, a detailed description of preferred embodiments of a method of setting up a wireless connection between two temporarily connected devices, a device interconnector for allowing a wireless connection to be set up between two temporarily connected devices as well as an arrangement and system for setting up a wireless connection between two temporarily connected devices according to the present invention will be given.

Connection of two devices to each other can be of interest in a variety of areas. One such area is in the field of electric power transfer, like for instance charging of batteries of transportation vessels.

Many transportation vessels today use electricity for powering their propulsion mechanisms. Today there are for instance electric vehicles that can be plugged into energy delivery posts or charging posts for having their batteries charged. However vessels that can be charged are not limited to vehicles, but other types of vessels like ships and boats may also employ such charging.

In the process of transferring power for charging a battery, it may be necessary to transfer data, such as data enabling an economical transaction concerning transfer of power. Other type of data that may be of advantage to transfer is charging control data, i.e. data used for controlling the charging as well as safety related data.

One easy and flexible way in which such data can be transferred is through providing a two-way wireless connection, which may be done using a number of known wireless protocols, for instance a short range wireless protocol such as Bluetooth or ZigBee. However, also other techniques are possible such as WLAN.

Figure 1:
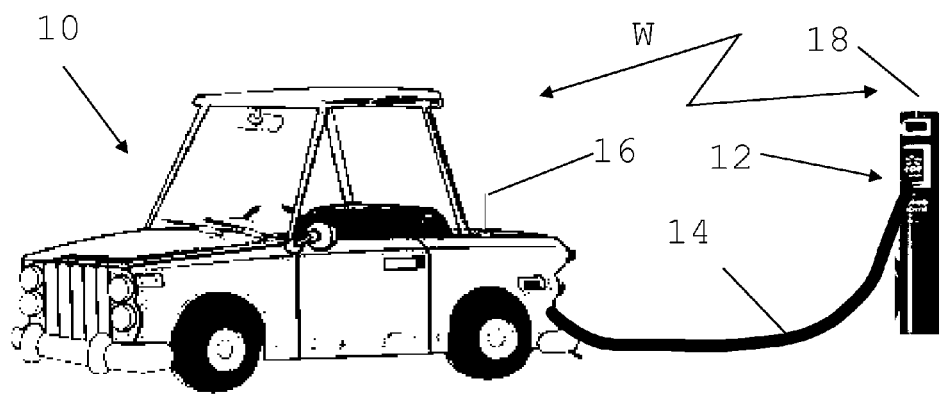

FIG. 1 schematically shows one such situation, where a first device in the form of a vehicle 10 is temporarily connected to a second device in the form of a charging post 12 via a device interconnector 14 in the form of an electric charging cable 14. Both these devices 10 and 12 are equipped with wireless communication ability, which is clear since they are each provided with an antenna 16 and 18. These antennas are also shown as providing two-way wireless communication W.

However, there is a problem in that the devices are normally not known to each other in a wireless sense. They do not know how to contact each other wirelessly. They do not know the size of the radio coverage area and which wireless identifier belongs to an entity with which communication is desired. The setting up of the wireless connection should furthermore be combined with a high-degree of user-friendliness. A user or driver should not have to provide the necessary information. It should be provided automatically as the devices are interconnected. This is not so easy to do, especially if there are many charging posts and vehicles provided in the same location. It is then quite hard to exactly determine which two devices are to communicate with each other concerning the connection and the quantity being transferred between them.

The present invention is directed towards solving this and other problems.

Figure 2:
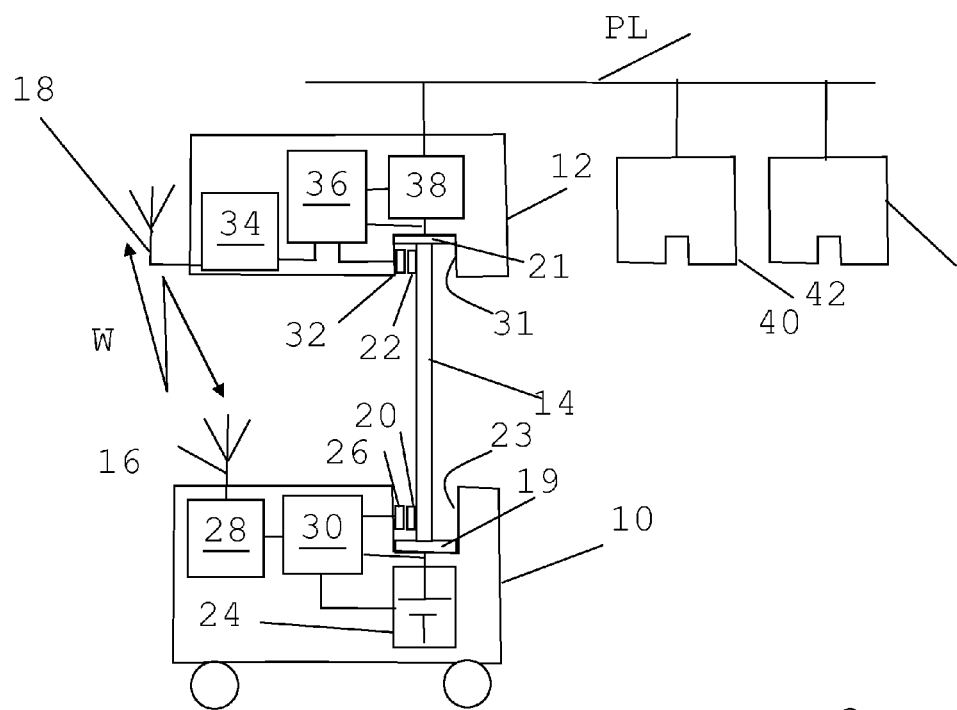
FIG. 2 shows a block schematic outlining a charging station including the charging post, cable and vehicle in FIG. 1.

How this may be solved can be understood from FIG. 2, which shows a block schematic of a charging station including a number of charging posts 12, 40 and 42 being connected to a power line PL of a power distribution network. One 12 of the charging posts is here the charging post in FIG. 1. The figure also depicts the vehicle 10 and the cable 14 from FIG. 1. Each of the charging posts 12, 40 and 42 may here be configured in the same way, while only one, the charging post 12 that the vehicle 10 is connected to, is shown in some more detail.

The vehicle 10 here includes a first interconnector mating unit 23 where a first end 19 of the cable 14 is received. The first interconnector mating unit 23 may with advantage be a socket and the first end a plug that can be inserted in this socket. In order to be charged the vehicle includes a battery 24 being electrically connected to the socket.

In the same way the charging post 12 is equipped with a second interconnector mating unit 31, also here in the form of a socket, in which a second end 21 of the cable 14, also in the form of a plug, can be inserted.

It should here be realized that the use of plug and sockets is merely one example of device interconnector end and interconnector mating unit that can be used.

In this way it is possible to charge the vehicle battery 24 with electrical power received from the power line PL via a power conversion unit 38 provided in the charging post 12. As an alternative it is possible that the conversion unit is provided in the vehicle.

Some of what has been described so far is conventional and nothing new.

However, in order to be able to set up a dedicated two-way wireless connection according to the principles of the invention there are a number of additional units included in FIG. 2.

First of all the first end of the cable 14 is provided with a first set of identifying data, which first set includes a first wireless communication identifier, which is a wireless communication identifier being associated with the cable. It can thus be an identifier identifying the cable. This wireless communication identifier can in its simplest form be provided as a series of characters, such as a series of integers. The vehicle 10 has to be able to read this set of identifying data and therefore the set is stored in a first information carrier 20. This information carrier may be provided in the form of a near field communication tag, such as a Radio Frequency IDentification (RFID) tag. It may also be provided in other ways, such as through a bar code.

The vehicle 10 is for this reason also provided with a corresponding first reading unit 26, i.e. a reader configured or able to read the data stored in the information carrier, and in the case of near field communication such as RFID, in the form of an RFID reader. It could of course also have been a bar code reader or other suitable reader based on the technology used for implementing the information carrier. The first reading unit 26 is located at the first interconnector mating unit and in this example also in this first interconnector mating unit.

In the same way the second end of the cable 14 is provided with a second set of identifying data, which second set includes a second wireless communication identifier, which is a wireless communication identifier also associated with the cable. It may therefore also identify the cable. This second wireless communication identifier can also be provided as a series of characters, such as a series of integers. The charging post 12 has to be able to read this set of identifying data and therefore it is also provided with a second reading unit 32 that is able to read the second wireless communication identifier. Also here the reading unit is of the type associated with the type of information carrier used and in this example an RFID reader. Also the second reading unit is located at the second interconnector mating unit and in this example also in this second interconnector mating unit.

In order to be able to set up the wireless connection the first reading unit 26 in the vehicle 10 is electrically connected to a first control unit 30. The first control unit 30 is furthermore electrically connected to the battery 24, to the first interconnector mating unit 23 and to a first wireless communication unit 28, which in this embodiment is a ZigBee communication unit. It could here be another type of communication unit such as another type of communication unit like a Bluetooth unit or a WLAN unit. The wireless communication unit 28 is in turn electrically connected to the antenna 16. The interconnector mating unit 23 may here be provided with a detector (not shown) for detecting the mating of the device interconnector, i.e. the insertion of the plug in the socket. It is then this detector of the interconnector mating unit that is connected to the first control unit 30.

In the same way the second reading unit 32 in the charging post 12 is electrically connected to a second control unit 36. The second control unit 36 is furthermore electrically connected to the power conversion unit 38, to the second interconnector mating unit 31 and to a second wireless communication unit 34, which in this embodiment is also a ZigBee communication unit, but can of course also be of another type. The wireless communication unit 34 is finally electrically connected to the antenna 18. The second interconnector mating unit 36 may also here be provided with a detector (not shown) for detecting the mating of the device interconnector, i.e. the insertion of the plug in the socket. It is then this detector that is connected to the second control unit 36.

Figure 3:
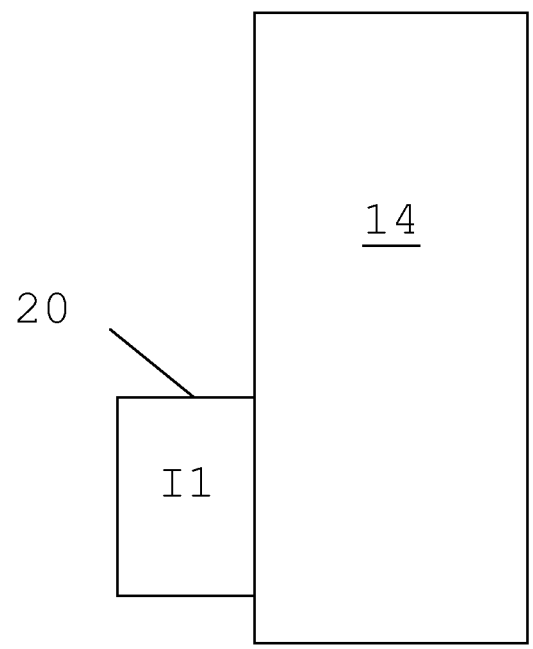
FIG. 3 schematically shows the content of a first information carrier at a first end of the cable.
Figure 4:
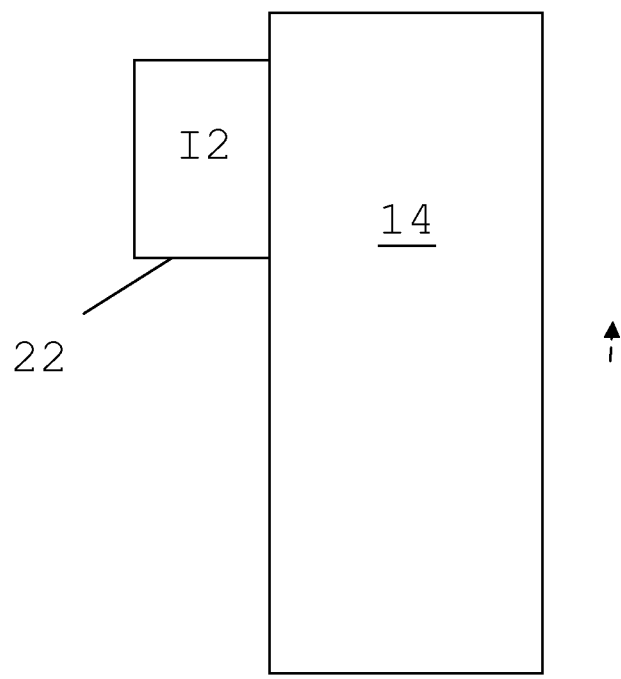
FIG. 4 schematically shows the content of a second information carrier at a second end of the cable.

FIG. 3 schematically shows the first information carrier 20 on the cable 14 and its content, which in this example only includes the first wireless communication identifier I1 and FIG. 4 schematically shows the second information carrier 22 on the cable 14 and its content, which in this example only includes the second wireless communication identifier I2.

Figure 5:
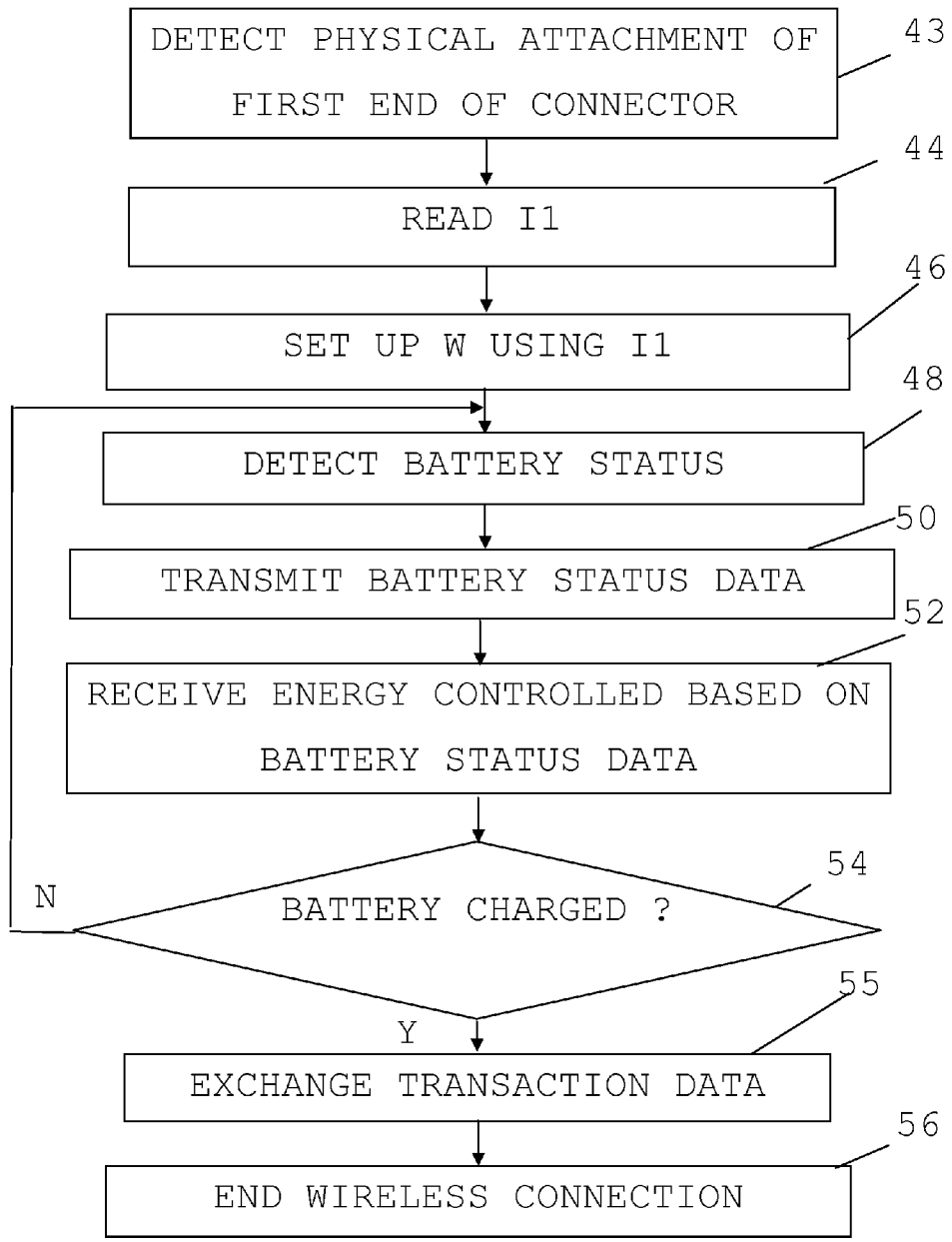
FIG. 5 schematically shows a flow chart of a number of method steps being performed in the vehicle.
Figure 6:
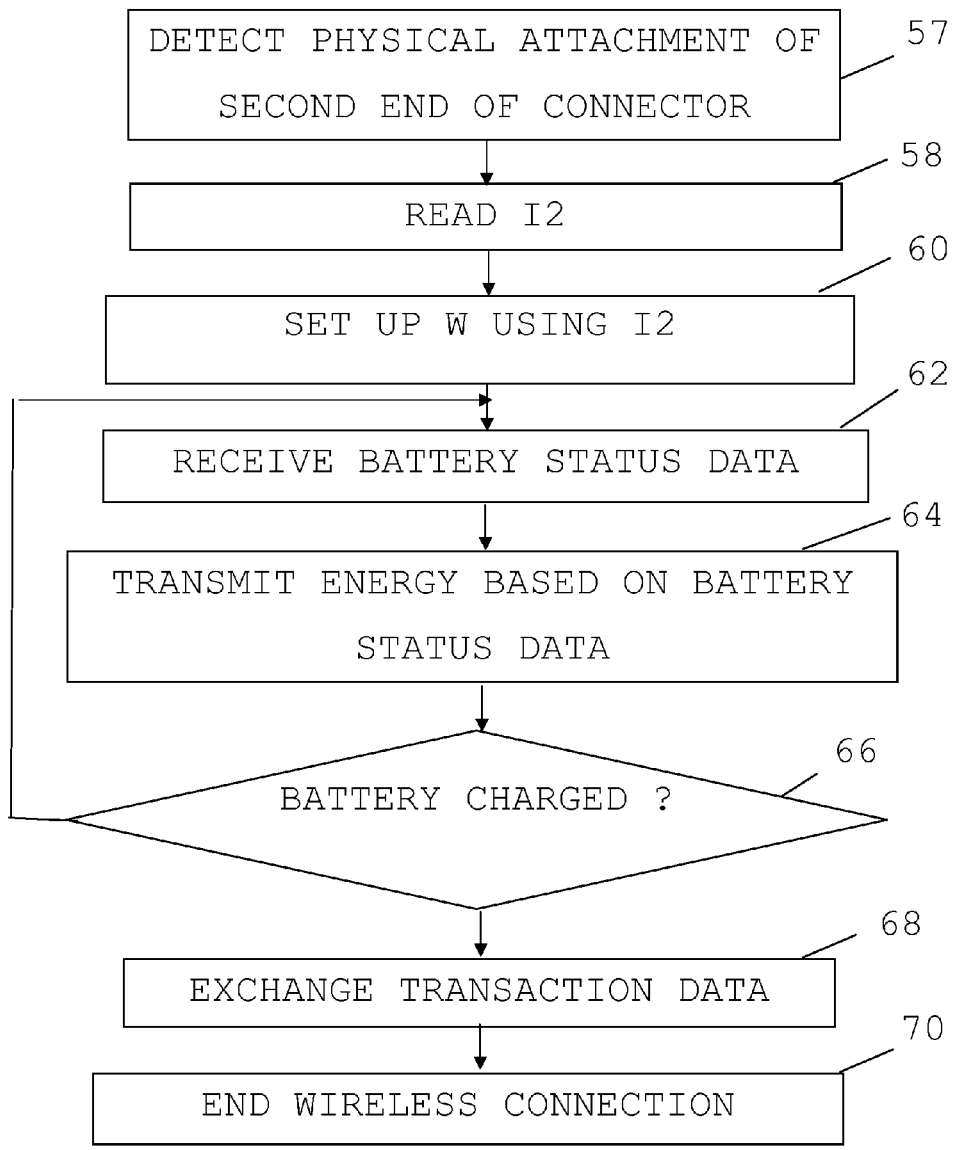
FIG. 6 schematically shows a flow chart of a number of method steps being performed in the charging post.

Now as the system has been described the functioning of the present invention will be described in more detail with reference also being made to FIG. 5, which schematically shows a flow chart of a number of method steps being performed in the vehicle and to FIG. 6, which schematically shows a flow chart of a number of method steps being performed in the charging post.

As is evident from the previous description the device interconnector, here in the form of the cable 14, plays an important part. This cable 14 is free at both ends. This means that each end can be connected or attached to any device having a suitable interconnector mating unit or socket. Each end is thus adapted to be attached to an interconnector mating unit. It is therefore not like in most system where energy is supplied to vehicles using one fixedly attached to a post. The cable used here may typically also be a cable belonging to the user of the vehicle. This means that the cable may be a piece of charging equipment that the user of the vehicle brings along in the vehicle and uses for the charging of the vehicle battery at different charging stations. As mentioned earlier this cable is equipped with two wireless communication identifiers, a first and a second wireless communication identifier. In the embodiment described here, these identifiers are the same, i.e they are identical. The same identifier thus appears at both ends of the cable. It should however be realized that they need not be the same. In some variations of the invention they are not identical. They should however be related or correspond to each other, which means that one of the identifiers should be possible to deduce through the other. They may for instance have the reversed order of characters or together form a pair of cryptographic keys. Both identifiers do however have to be unique in the sense that no other cable can be provided with any of them.

As the user now wants to charge the battery 24 of the vehicle 10 he or she inserts the first end 19 of the cable 14 in the first socket 23 and the second end 21 of the cable 14 in the second socket 31. The information carriers including sets of identifying data may here have such positions on the device interconnector that the content can be read by the corresponding reading unit, when the device interconnector is attached to a device, i.e. attached to an interconnector mating unit. This may be done through a reading unit being placed in a position on a wall of the socket, which position the information carrier will face or be aligned with as the cable plug is inserted in the socket. This will thus happen on both sides of the cable, i.e. both in the vehicle 10 and in the charging post 12.

As this is done, the detector in the first socket 23 sends a signal to the first control unit 30 indicating that the device interconnector 14 is attached. In this way the first control unit 30 detects the physical attachment of the first end 19 of the device interconnector 14 to the first interconnector mating unit 23, step 43, i.e. the insertion of the first plug of the cable in the first socket 23. After this is done the first control unit 30 then orders the first reading unit 26 to read the content of the first information carrier 20. The first reading unit 26 of the vehicle 10 then reads or detects at least the first wireless communication identifier I1 of the first set of identifying data of the attached connector, step 44, and forwards this wireless communication identifier I1 to the first control unit 30.

In the same way the detector in the second socket 31 sends a signal to the second control unit 36, which in the same way detects the physical attachment of the second end 21 of the device interconnector 14 to the second interconnector mating unit 31, step 57, i.e. the insertion of the second plug of the cable in the second socket 31. After this is done the second control unit 36 then orders the second reading unit 32 to read the content of the second information carrier 22, which reading unit 32 goes on and reads or detects at least the second wireless communication identifier I2 of the second set of identifying data of the attached connector, step 58, and forwards this wireless communication identifier I2 to the control unit 36.

After having received the first communication identifier I1, the first control unit 30 then controls the first wireless communication unit 28 to set up a dedicated wireless connection W with the charging post 12 using the first wireless communication identifier I1, step 46, and the second control unit 36 controls, after having received the second wireless communication identifier I2, the second wireless communication unit 34 to set up the dedicated wireless connection W using the second wireless communication identifier, step 60. There is thus one two-way wireless connection set up using both the first and the second wireless communication identifier I1 and I2. The wireless communication units thus set up the wireless connection in conjunction with each other.

The wireless communication identifiers can here be used in a number of ways. The connection can for instance be set up through one of the devices querying neighboring devices about a wireless communication identifier, receiving responses from devices in the neighborhood and selecting one which responds with a wireless communication identifier corresponding to its own wireless communication identifier. It could also be done through the devices announcing their wireless communication identifiers to each other and the two that share the same or have corresponding identifiers then set up a connection. The connection could furthermore be set up through broadcasting a message encrypted with one of the wireless communication identifiers from one of the devices, where the only other device that can decrypt the message is one having the other wireless communication identifier and thus the one with which communication is to take place.

Once the dedicated two-way wireless connection W is set up it is then possible to transmit data over it. The devices can thus exchange data with each other over the wireless connection W. It is here possible to transfer data specifying voltage, current and/or power ratings. It is furthermore possible to transfer data identifying the voltage of the post and vehicle as well as current limits of the post and vehicle. It is also possible to transmit stop and start commands. Generally though it is possible to control the charging performed based on data exchanged over the dedicated wireless connection.

As an example the first control unit 30 of the vehicle 10 may detect the status of the battery 24 like the degree of charge it has, step 48, and then transmit battery status data to the second control unit 36 via the connection W, step 50. The first control unit 30 may then receive energy from the charging post 12 based on this data, step 52. The control unit 30 may thereafter check if the battery is fully charged and if it is, step 54, then transaction data may be exchanged with or communicated to the charging post, step 55, followed by the ending of the wireless connection, step 56, while if the battery is not fully charged, battery status may again be checked and the battery continued to be charged based on battery status data. Transaction data being exchanged may involve the charging post informing the vehicle about the amount of energy transferred and the price and the vehicle informing the charging post about mode of payment.

The second control unit 36 of the charging post 12 may thus receive the battery status data, step 62, and based on this it may then determine the amount of power that is to be transferred. In this determination it is here possible to take account of the status of the battery. However, it is also possible to take account of other factors, such as if there are other vehicles connected to neighboring charging posts and the battery status of such batteries. It is also possible to consider other factors, like for instance how much energy the distribution network to which the power line PL belongs is able to deliver.

Based on all this data, the second control unit 36 may then control the wireless communication unit 38 to transmit, via the cable 14, energy to the vehicle 10 based on the battery status data and possible other data as mentioned above, step 64.

Here the second control unit 36 may also investigate if the battery is fully charged or receive information from the vehicle that the battery is fully charged, step 66, and may also continue charging or communicate or exchange transaction data, step 68, and then end the wireless connection, step 70, based on the decision.

In this way it is possible to transfer a lot of data between vehicle and charging post in conjunction with the transferring of electrical power from the charging post to the vehicle. This is furthermore done in a very user-friendly way. The only thing the user has to do is to connect the cable to the two devices. It is here of course possible that the user may be informed of the charging process, which may be done on a display in the vehicle or in the charging post. The connection is furthermore both secure and flexible.

This was just one example of how the wireless connection can be used. There are countless other ways.

Take the ending of the wireless connection as an example. Above this was based on the battery being fully charged. An alternative to this is to base the ending of the wireless connection on the fact that the cable is being disconnected. Furthermore, in the example given above, the charging control was performed by the charging post. It is possible that this control is instead performed in the vehicle. It is also possible to split the control into parts, with one entity performing ordinary charging control and another entity performing control based on the status of the power distribution network. The first part may be performed in either the vehicle or the first charging post, while the second part may be performed in the charging post or in some higher level control unit. This higher unit may furthermore be associated with the power distribution system or the charging post station.

Charging control can also involve applying current limitations, i.e. impose a given maximum current that can be absorbed from the power line. Further possible functions in relation to charging are blocking the charging during a given time window. Charging may thus be forbidden in a set time interval and allowed in other time intervals.

It should here be realized that also other types of data may be transferred via the wireless connection. If the vehicle is a commercial vehicle, it is for instance possible to transfer driving plans, traffic log data, shipping orders and other types of commercial vehicle data via the connection.

It is furthermore possible that the various sets of identifying data includes the above mentioned wireless communication identifiers and in addition to this also cryptographic keys. In this way wireless communication identifiers can be used for identifying devices that are to communicate, while the cryptographic keys are used for encrypting data on the wireless connection in order to enhance security. A set of data may also include additional information related to the device interconnector, such as cable type and current rating, manufacturer, production date etc. A wireless communication identifier may furthermore be a radio address or network address that is temporarily being assigned to a device.

The connection to the vehicle may be a DC or an AC connection. Depending on the type, different types of converters are needed in vehicle and charging post.

It should also be realized that the invention is not limited to charging of vehicle batteries. It is also possible to use the invention in other electrical energy delivery situations, for instance in relation to a piece of electrically operated equipment being connected to a distribution box, for instance at a building site or in an industrial environment. Such a piece of equipment may for instance be a fan, to which energy is delivered based on the amount of humidity detected in the air. The energy of the fan could then be controlled based on the humidity. Monitoring and control data concerning the piece of equipment can in this way be transferred over the wireless connection.

The invention could also be provided in relation to filling a tank with a liquid or solid entity, such as filling a tank with gasoline, oil or gas or pellets.

The filling can then be controlled based on the level/pressure in the tank. In all these cases the wireless communication identifiers on the cables are used for setting up a wireless connection.

The device interconnector can thus be a cable for transporting a quantity or flux of a physical entity, like a liquid such as oil, gasoline or a gas from one of the devices to the other. The flux may thus be an energy flux or the flux of a fluid or gas. The data being exchanged over the wireless connection can then be used for controlling the transportation of the quantity or the flux in question.

The invention thus has a number of advantages, apart from those already mentioned. The invention solves the problem of how to make sure that the correct two devices are connected even if there are many similar devices within the range covered by the radio communication units. The invention is also easy to use for a user. The wireless connection is automatically set up as the device interconnector is attached to two devices. This is especially important in applications for daily use like charging of electric vehicles. The invention also provides increased safety, since there is no mixing of power and data lines or adding of electronic hardware for power line communication. The invention can be provided at low cost because the information carriers and the reading units can be high volume, low cost standard components. The invention is furthermore robust. This is due to the fact that the information carriers and reading units can be hidden inside plastic housings of the plugs and sockets. The invention is also versatile, since the principle can be used in many applications where data communication is not used today because of the competence and extra work that has been needed.

The control units may each be realized in the form of a processor with accompanying program memory comprising computer program code that performs the desired control functionality when being run on the processor. The communication units may with advantage be provided through integrated circuits implementing the communication protocol used. The sensing of connectors can involve voltage sensing means and A/D converters.

From the foregoing discussion it is evident that the present invention can be varied in a multitude of ways. It should for instance be realized that there is no need for a separate detecting unit detecting the attachment of a device interconnector. A reading unit may combine the reading function with such a detecting function. It may thus determine that a device interconnector is attached if it is able to read a set of identifying data. It shall consequently be realized that the present invention is only to be limited by the following claims.

What is claimed is:

1. A method of setting up a wireless connection between two temporarily connected devices, the method comprising:

detecting a physical attachment of a first end of a device interconnector to an interconnector mating unit of a first device, said first end being provided with a first wireless communication identifier, detecting a physical attachment of a second end of the device interconnector to an interconnector mating unit of a second device, said second end being provided with a second wireless communication identifier, reading the wireless communication identifier of each end of the device interconnector the attachment of which has been detected, setting up a dedicated two-way wireless connection between the two devices, and exchanging data between the two devices over the wireless connection.

2. The method of claim 1, wherein the device interconnector is a cable for transporting a quantity of a physical entity between the two devices, and the data being exchanged over the wireless connection is used for controlling the transportation.

3. The method of claim 2, wherein the quantity is electrical power.

4. The method of claim 1, wherein the first and second wireless communication identifiers are the same.

5. The method of claim 1, wherein each wireless communication identifier includes a cryptographic key and the method further comprises encrypting data on the wireless connection by applying the cryptographic key of the corresponding wireless communication identifier.

6. The method of claim 1, wherein one of the devices is a vehicle and the other device is an energy delivery post.

7. An arrangement for setting up a wireless connection between two temporarily connected devices, said arrangement comprising:

a device interconnector having a first end and a second end, where said first end is provided with a first wireless communication identifier and said second end is provided with a second wireless communication identifier related to the first wireless communication identifier, a first device including an interconnector mating unit for receiving the first end of the device interconnector, the first device further including a reading unit configured to detect said first wireless communication identifier and to read a first identifying data comprised in it, and the first device further including a wireless communication unit configured to receive the first identifying data and to and set up a dedicated two-way wireless connection between the first device and a second device.

8. The arrangement of claim 5, said first device further comprising a control unit configured to control the wireless communication unit.

9. The arrangement of claim 5, wherein said first device is a transportation vessel.

10. The arrangement of claim 7, wherein said second device is an energy delivery post.

11. The arrangement of claim 7, wherein said second device is an electrical distribution box.

12. A device interconnector for allowing a wireless connection to be set up between two temporarily connected devices, said device interconnector having a first end adapted to be attached to a first device and a second end adapted to be attached to a second device, said first end comprising a first wireless communication identifier and said second end comprising a second wireless communication identifier in order to allow the first and second devices to detect identifying data comprised in the first and second wireless communication identifiers upon the physical attachment of the device interconnector to these devices for use in the setting up of one two-way wireless connection between them based on the identifying data.

13. A system for setting up a wireless connection between two temporarily connected devices, said system comprising a device interconnector having a first end and a second end, where said first end is provided with a first wireless communication identifier and said second end is provided with a second wireless communication identifier related to the first wireless communication identifier, a first device having a first interconnector mating unit, a first wireless communication unit and a first reading unit, a second device having a second interconnector mating unit, a second wireless communication unit and a second reading unit, wherein the wireless communication units of said devices are both configured to receive identifying data comprised in a wireless communication identifier being read by the corresponding reading unit as the device interconnector is attached to the corresponding mating unit and the wireless communication unit is configured to employ this identifying data in setting up, in conjunction with the other wireless communication unit, a dedicated two-way wireless connection between the two devices.

* * * * *